United States Patent [19]

Magane et al.

[11] 4,231,590
[45] Nov. 4, 1980

[54] SAFETY BELT SYSTEM FOR VEHICLES

[75] Inventors: Shigeo Magane, Fujisawa; Kazuo Yamamoto, Sagamihara, both of Japan

[73] Assignee: NSK-Warner K.K., Tokyo, Japan

[21] Appl. No.: 18,367

[22] Filed: Mar. 7, 1979

[30] Foreign Application Priority Data

Mar. 10, 1979 [JP] Japan ............................ 53-29594[U]

[51] Int. Cl.³ ............................................. A62B 35/00
[52] U.S. Cl. ..................................... 280/803; 280/804
[58] Field of Search ............... 280/802, 803, 804, 807, 280/808; 297/468, 469, 474, 475, 473, 476, 477, 478, 483

[56] References Cited

U.S. PATENT DOCUMENTS

| | | | |
|---|---|---|---|
| 3,827,714 | 8/1974 | Lefeuvre | 280/804 |
| 3,933,369 | 1/1976 | Kaneko | 280/803 |
| 3,976,305 | 8/1976 | Fieni | 280/802 |
| 4,004,829 | 1/1977 | Kato | 280/802 |

FOREIGN PATENT DOCUMENTS 1407612 9/1975 United Kingdom ..................... 280/804

Primary Examiner—John J. Love
Assistant Examiner—Randall A. Schrecengost
Attorney, Agent, or Firm—Shapiro and Shapiro

[57] ABSTRACT

In a vehicle having a door openable and closable with the forward and sidewise portion of the vehicle body viewed from a seat as the center of rotation, a safety belt system comprises a first webbing, a loop for dividing the first webbing into a shoulder belt part and a waist belt part, a second webbing, and means for moving the loop. The opposite ends of the first webbing are respectively secured to the neighborhoods of the upper and the lower ends of the door edge opposite from the center of rotation. One end of the second webbing is secured to the loop and the other end thereof is attached to the side of the seat opposite from the door side. The moving means moves the loop back and forth along said opposite side of the seat and the forward extension thereof in response to the opening and closing of the door.

2 Claims, 2 Drawing Figures

4,231,590

SAFETY BELT SYSTEM FOR VEHICLES

BACKGROUND OF THE INVENTION

1. Field of the Invention

This invention relates to a safety belt system for vehicles. More particularly, it relates to a so-called passive safety belt system wherein when an occupant gets on the vehicle and then takes a seat, he may be automatically restrained by a safety belt and when he wants to get off the vehicle, he may be automatically released from the safety belt.

2. Description of the Prior Art

Various safety belt systems of this passive type have already been proposed. However, many of them do not permit easy egress and ingress of the occupant, or are complicated in construction. As a result, very few of them are available in practice and in industry.

SUMMARY OF THE INVENTION

It is an object of the present invention to provide a safety belt system which is simple in construction and easily used.

To achieve such object, the present invention provides a safety belt system for vehicles having a door openable and closable with the forward and sidewise portion of the vehicle body viewed from a seat as the center of rotation, which belt system comprises a first webbing providing a shoulder belt part and a waist or lap belt part, the opposite ends of said first webbing being respectively secured to the neighborhoods of the upper and the lower ends of the door edge opposite from said center of rotation, said first webbing being divided into the shoulder belt part and the lap belt part by a loop, a second webbing having one end thereof secured to the loop and the other end secured to the side of the seat opposite from the door side, and means for moving the loop back and forth along said opposite side of the door and the forward extension thereof in response to the opening and closing of the door.

The invention will become more fully apparent from the following detailed description thereof taken in conjunction with the accompanying drawings.

DESCRIPTION OF THE PREFERRED EMBODIMENTS

Figure 1:
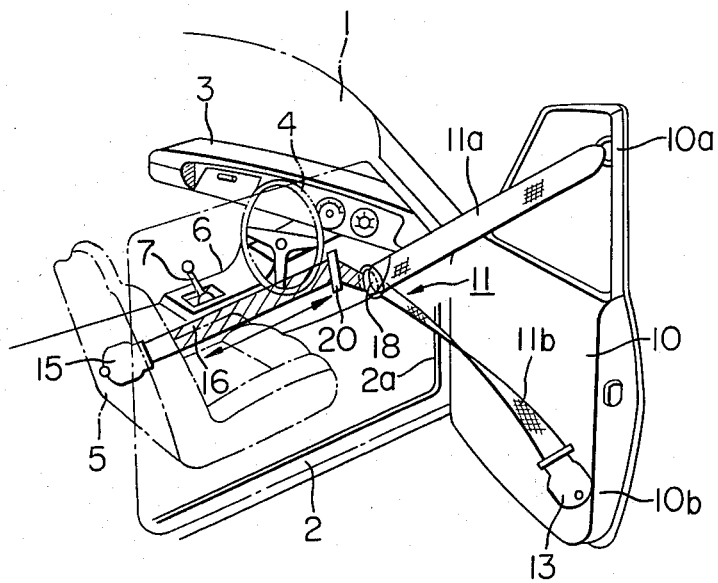
FIG. 1 is a schematic perspective view showing an embodiment of the present invention.

Referring to FIG. 1, it schematically shows in perspective view the front compartment of a vehicle including the essential portions of a preferred embodiment of the present invention. A body 1 of the vehicle has a door frame 2. As a matter of course, an instrument board 3 and a steering wheel 4 are provided on the front of the body 1. A front seat 5 is indicated by dot-and-dash lines and a console box 6 extending longitudinally of the body 1 is provided at the center of the compartment. A selector lever 7 is also provided. At the front frame portion 2a of the door frame 2, a door 10 is provided so as to be opened and closed by being pivotally moved about the front frame portion 2a in a well-known manner.

In the present embodiment, a first webbing 11 having a shoulder belt part 11a and a waist or lap belt part 11b has its upper end attached to a point 10a near the upper end of the open side edge of the door 10 by a well-known anchorage and has its lower end protractably and retractably packed in a retractor 13 which is in turn attached to a point 10b near the lower end of the open side edge of the door. The retractor 13 may be attached to the point 10a near the upper end of the door instead of the point 10b near the lower end of the door. Also, the opposite ends of the webbing 11 may be directly secured to the points 10a, 10b near the upper and lower ends of the door by well-known means without using the retractor.

On the other hand, on the inner side of the seat 5, namely, on the side which is adjacent to the console box 6, a retractor 15 is provided and a second webbing 16 is protractably and retractably packed in the retractor 15. The outer end of the second webbing 16 is secured to a loop 18. The first webbing 11 passes through the loop 18 and is thereby turned back to provide the aforementioned shoulder belt part 11a and waist belt part 11b.

A runner 20 is provided on the side of the console box 6 and the runner 20 is movable back and forth, namely longitudinally, along the side of the console box 6 by unshown drive means contained in the console box 6. The second webbing 16 is adapted to be forwardly drawn or backwardly rewound by the movement of the runner 20. When the door 10 is opened, the unshown drive means, which operation is linked to the movement of the door 10, drives the runner 20 to its shown forward position, thereby bringing forward the first and second webbings 11, 16 to permit the entrance and exit of the occupant. When the door is closed, the drive means guides the runner 20 backwardly in response to the closing of the door, whereby the second webbing 16 is reeled back into the retractor 15 until the first webbing 11 properly straps the body of the occupant.

It should be noted that the reel spring (not shown) of the retractor 15 for the second webbing must be selected to have a stronger spring force than the reel spring (not shown) of the retractor 13 for the first webbing and that the amount of winding of the retractor 13 must be determined in accordance with the kind of the vehicle.

Figure 2:
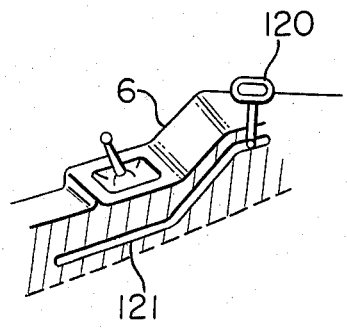
FIG. 2 is a partial perspective view showing a modification of the embodiment shown in FIG. 1.

To further facilitate the egress and ingress of the occupant, the runner may be formed so as to extend above the console box 6 as indicated by a reference numeral 120 in FIG. 2. The elongated slot 121 formed lengthwisely in the side of the console box 6 shown in FIG. 2 serves as a guide groove for the runner.

According to the present invention, a safety belt system may be achieved which is very simple and which facilitates the egress and ingress of the occupant. Further, according to the present invention, a rigid member such as a swinging arm is not projected into the space of the compartment to enhance the occupants' safety in case of collision or the like.

While there have been described and illustrated the preferred embodiment of the present invention, it is apparent that numerous alterations, omissions, additions may be made without departing from the spirit thereof.

What we claim is:

1. A passive safety belt system for a vehicle having a door with an edge hinged to a forward and side portion of the vehicle and having a seat with a first side adjacent to said door, said belt system comprising:

a first webbing providing a shoulder belt part and a waist belt part, the opposite ends of said first webbing being respectively positioned adjacent to upper and lower ends of the door edge opposite from the hinged edge;

first retractor means secured to said door, one end of said first webbing being connected to said first retractor means for protraction and retraction and the other end of said first webbing being secured to the door;

a loop member on said first webbing dividing said first webbing into said shoulder belt part and said waist belt part;

a second webbing having one end thereof attached to said loop member;

second retractor means adjacent to a second side of the seat opposite the first side, said second retractor means being connected to the other end of said second webbing for protraction and retraction, the retractive force of said second retractor means being stronger than that of said first retractor means; and moving means engaged with said second webbing and movable along said second side of the seat in response to opening and closing of said door for moving both said webbings forward and backward relative to said seat.

2. A system according to claim 1, wherein said moving means is adapted to move along a side of a console box.

* * * * *